No. 896,349.

PATENTED AUG. 18, 1908.

W. S. BICKLEY.
STOCKLESS ANCHOR.
APPLICATION FILED OCT. 6, 1904.

WITNESSES:

INVENTOR
Walter Scott Bickley,
BY
Attorney

UNITED STATES PATENT OFFICE.

WALTER SCOTT BICKLEY, OF CHESTER, PENNSYLVANIA.

STOCKLESS ANCHOR.

No. 896,349.  Specification of Letters Patent.  Patented Aug. 18, 1908.

Application filed October 6, 1904. Serial No. 227,415.

*To all whom it may concern:*

Be it known that I, WALTER SCOTT BICKLEY, citizen of the United States, residing at Chester, in the county of Delaware and State of Pennsylvania, have invented certain new and useful Improvements in Stockless Anchors, of which the following is a specification.

My invention relates to stockless anchors and has for its object to improve this class of anchors and to strengthen the head.

A further object of my invention is to produce an anchor of this character that can readily be made of cast steel which will make it equal to a wrought iron anchor, being ductile and of equal strength of forging.

Figure 1:
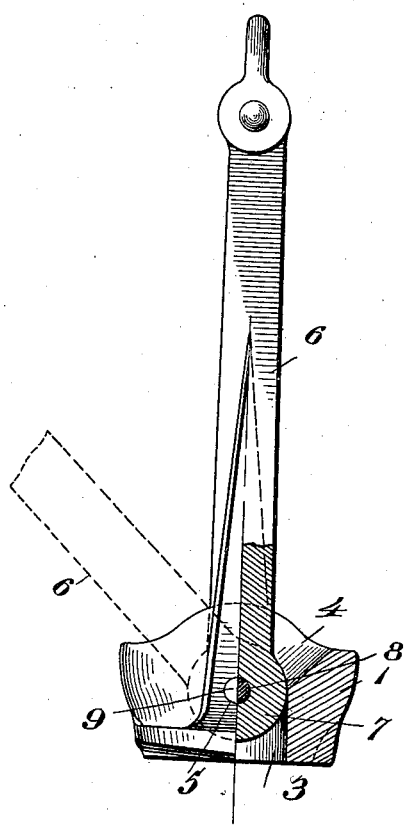
Figure 2:
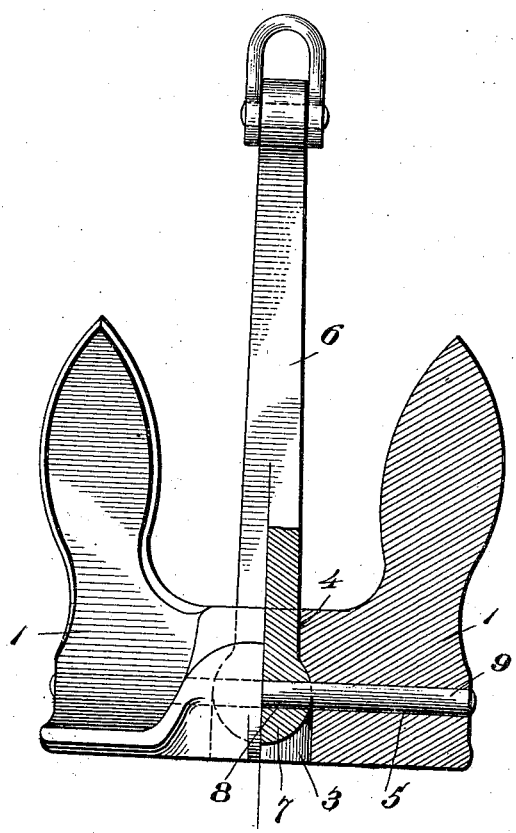

In the drawing Figure 1 is an end view of an anchor embodying my invention, parts being in section. Fig. 2 is a front elevation of the same, parts being in section.

1 indicates a head of the anchor having a recess 3 which terminates in a ball socket.

4 is an opening on the fluke side of the head communicating with said ball seat and recessed. The head is provided with an opening 5 extending from one end thereof to the other.

The shank 6 is provided on its lower end with a ball 7 adapted to seat in the ball socket of the head, said ball having a central opening therethrough as at 8, said opening registering with the opening 5 in the head when the ball is properly seated in the socket of the head. 9 is a pin or bolt extending through said opening 5 from end to end of the head; said bolt also passing through the opening 8 of the ball 7 thereby firmly locking the ball to its seat, thus securing the shank firmly to the head. The bolt or rod 9 being of wrought metal, and extending from one end to the other of the head, has a tendency to increase the strength of the head inasmuch as it bridges the recess 3.

This construction provides a very simple stockless anchor, one of maximum strength and readily assembled. It is customary to upset the metal at the end of the rod 5 whereby the same is firmly riveted in place in the head. This anchor is open sufficiently in the back to allow the dirt to pass through, thereby preventing the fouling of the anchor.

Having thus described my invention what I claim is:

In a stockless anchor, the combination with the head provided with a ball seat constructed entirely above the lowermost horizontal plane thereof, of a shank terminating at its lower end in a spherical ball, said ball having an axial opening therethrough, said head having longitudinal axial openings above its lowermost horizontal plane constructed to register with the opening in the ball when the ball is seated, and a rod positioned in said openings in the head and ball to lock the ball on its seat and reinforce the said head, said seat in the head being open under the ball.

In testimony whereof I affix my signature in presence of two witnesses.

WALTER SCOTT BICKLEY.

Witnesses:
 NORRIS D. POWELL,
 WILLIAM E. EBY.